(12) United States Patent
Mizutani

(10) Patent No.: US 6,554,396 B1
(45) Date of Patent: Apr. 29, 2003

(54) INK-JET PRINTING APPARATUS AND METHOD

(75) Inventor: Michinari Mizutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/703,659

(22) Filed: Nov. 2, 2000

(30) Foreign Application Priority Data

Nov. 2, 1999 (JP) .......................................... 11-312954

(51) Int. Cl.⁷ .................................................. B41J 2/15
(52) U.S. Cl. ...................................................... 347/41
(58) Field of Search ............................ 347/40, 41, 43, 347/12, 15, 16, 14, 56, 65, 10, 47

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 5,880,757 A * | 3/1999 | Ta | 347/40 |
| 6,164,745 A * | 12/2000 | Nagoshi et al. | 347/15 |
| 6,183,062 B1 * | 2/2001 | Curtis et al. | 347/41 |
| 6,209,987 B1 * | 4/2001 | Katayama | 347/43 |

FOREIGN PATENT DOCUMENTS

| | | | |
|---|---|---|---|
| JP | 77123349 | 10/1977 | .............. B41J/5/26 |
| JP | 82230072 | 12/1982 | .............. B41J/3/04 |
| JP | 8312444 | 1/1983 | .............. B41J/3/04 |
| JP | 83178201 | 9/1983 | .............. B41J/3/04 |

* cited by examiner

Primary Examiner—Lamson Nguyen
(74) Attorney, Agent, or Firm—Fitzpatrick, Cella, Harper & Scinto

(57) ABSTRACT

In an ink-jet printing apparatus in which a carriage mounting an ink-jet printhead having a plurality of nozzles arrayed in a row of even-numbered nozzles and a row of odd-numbered nozzles for performing printing by discharging ink from the print elements is scanned back and forth over a print medium in a direction cross to the direction in which the print elements are arrayed to thereby print on the print medium, print data in conformity with the structure of the printhead is generated from entered information. Printing is carried out upon thinning print data, which is printed by the nozzles of the row of odd-numbered nozzles, if printing is performed by scanning the carriage in the forward direction, and upon thinning print data, which is printed by the nozzles of the row of even-numbered nozzles, if printing is performed by scanning the carriage in the reverse direction. This improves print quality by reducing edge roughness.

12 Claims, 15 Drawing Sheets

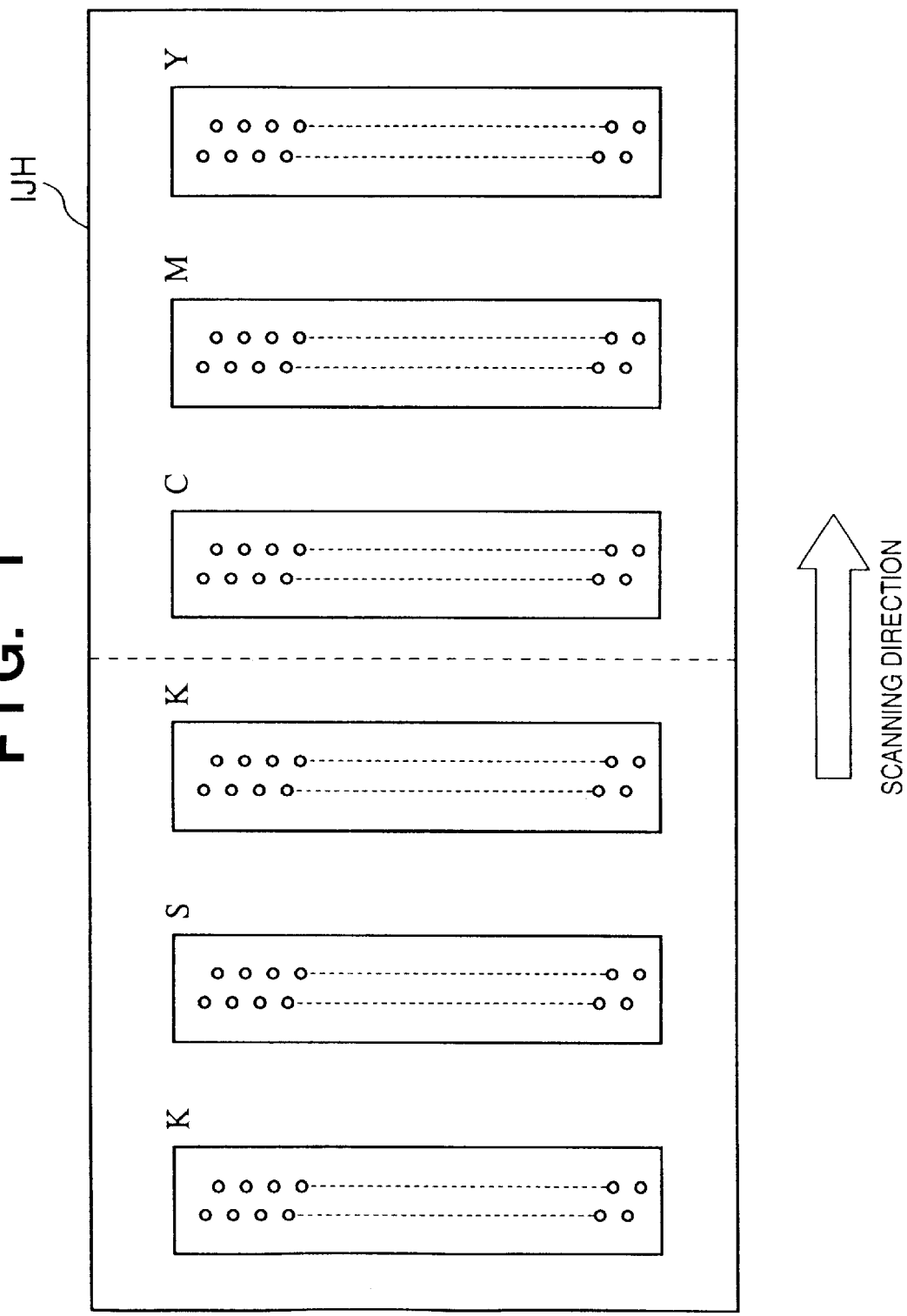

F → SCANNING DIRECTION (FORWARD DIRECTION)

E : NOZZLES IN ROW OF EVEN-NUMBERED NOZZLES
O : NOZZLES IN ROW OF ODD-NUMBERED NOZZLES

F
← 
SCANNING DIRECTION
( REVERSE DIRECTION )

E : NOZZLES IN ROW OF EVEN-NUMBERED NOZZLES
O : NOZZLES IN ROW OF ODD-NUMBERED NOZZLES

F
SCANNING DIRECTION
(FORWARD DIRECTION)

R
SCANNING DIRECTION
(REVERSE DIRECTION)

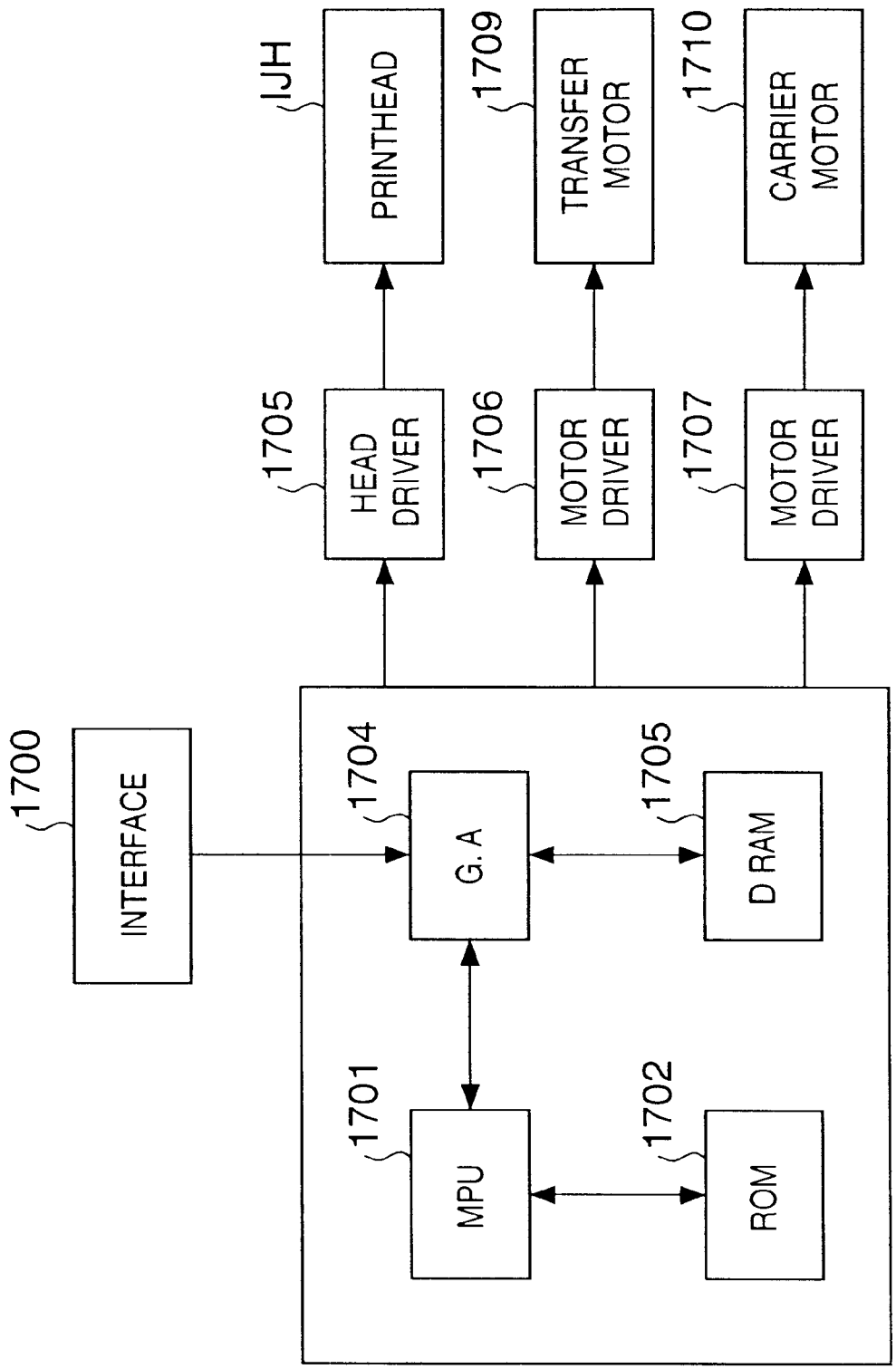

INK-JET PRINTING APPARATUS AND METHOD

FIELD OF THE INVENTION

This invention relates to an ink-jet printing apparatus and method and, more particularly, to an inkjet printing apparatus in which a carriage mounting an ink-jet printhead having a plurality of print elements arrayed in at least two rows for performing printing by discharging ink from the print elements is scanned back and forth above a print medium in a direction cross to the direction in which the print elements are arrayed to thereby print on the print medium, and to a printing method using this apparatus.

BACKGROUND OF THE INVENTION

A printer for recording information such as desired characters and images on a sheet-like print medium such as paper or film is available as an information output apparatus in a word processor, personal computer and facsimile machine, etc.

Though a variety of printing methods implemented by such a printer are known, the ink-jet method in particular has been the focus of attention in recent years because it is capable of printing on a print medium such as printing paper without making mechanical contact with the medium, because color printing can be performed with ease and because printing can be performed silently. From the viewpoint of low cost and small size, a widely employed printing technique is serial printing in which the ink-jet printing apparatus is fitted with a printhead for discharging ink in accordance with the desired print information and printing is carried out while the printhead is scanned back and forth at right angles to the direction in which the print medium such as printing paper is fed.

Recent improvements in the performance of such ink-jet printers have made it possible to achieve a high printing speed on a par with that of laser printers. An increase in the processing speed of personal computers and the spread of the Internet have led to ever greater demand for the printing of color images at higher and higher speeds.

One ink-jet technique is the bubble jet printing technique in which ink droplets are discharged from orifices by the pressure of bubbles produced by rapidly heating and vaporizing ink by means of a heating element. A bubble produced in a bubble jet printhead having such a structure is cooled by the surrounding ink so that the ink vapor within the bubble is condensed back into liquid form and vanishes.

Ink expended by discharge is replenished via an ink supply path from an ink tank containing the ink.

FIG. 9 is a diagram illustrating an example of the arrangement of nozzles 4 in such an ink-jet printhead. A row of even-numbered nozzles 4 is disposed on the left side of an ink supply path 105 and a row of odd-numbered nozzles 4 is disposed on the right side of the ink supply path 105. Ink is supplied from the ink supply path 105 via an ink flow path 5 provided in correspondence with each nozzle 4.

A known ink-jet printing technique other than the above-described bubble jet printing technique is the bubble through jet printing technique through which bubbles produced by rapidly heating and vaporizing ink by means of a heating element are discharged upon being passed through the outside air.

FIGS. 3A to 3D and FIGS. 3E to 3H illustrate the manner in which droplets are discharged in accordance with the bubble jet and bubble through jet techniques, respectively. The shape of the discharged ink varies in a time series as indicated by FIGS. 3A to 3D and FIGS. 3E to 3H.

Ink that has been discharged from the nozzle 4 leaves a tail immediately after being discharged, as in FIGS. 3A and 3E. A main droplet then starts to form at the leading edge in FIGS. 3B and 3F, the ink splits into a main droplet and satellites, as shown in FIGS. 3C and 3G, at the moment surface tension attempting to coalesce the ink is overcome, and the ink finally splits into a main droplet 31 and satellites 32, as indicated in FIGS. 3D and 3H.

The printhead which discharges ink by the above-described techniques will be described with reference to FIGS. 4A to 4C in regard to a case where the printhead is mounted on a transported carriage and a printing operation is carried out by moving the carriage back and forth in a direction cross to the direction in which the print medium is transported.

As illustrated in FIG. 4A, an ink droplet discharged from each ink nozzle of an even-numbered nozzle row and an ink droplet discharge from each nozzle of an odd-numbered nozzle row of each chip of a printhead IJH comprises a main droplet $78i$ ($i=1\sim n$), which impacts upon a print surface $76a$ of paper 76 serving as an example of a print medium to thereby form the main portion of one pixel constituting an image or character, and a satellite $78ai$ ($i=1\sim n$), which is the remainder of the discharged main droplet $78i$. The satellite $88ai$ flies is a fixed direction in dependence upon the release characteristics of the ink droplet, e.g., the printhead characteristics (the shape of the ink nozzle and the properties of the ink fluid).

In a case where the printhead IJH travels in the direction indicated by arrow F in FIG. 4A, e.g., in the forward direction, the impact position of the satellite $78ai$ relative to the main droplet $78i$ will be on the side opposite that of the direction of travel when the flying direction of the satellite $78ai$, which has been discharged from the nozzle of the row of even-numbered nozzles, relative to the main droplet $78i$ is opposite the direction indicated by arrow F.

Accordingly, if the structure of the printhead is such that the arrays of the nozzles on the sides of the even and odd numbers are substantially symmetrical with respect to the centrally located ink supply path, as illustrated in FIG. 9, the direction in which the satellite $78ai$ from the nozzle of the odd-numbered nozzle row flies relative to the main droplet $78i$ will be diagonally away from the main droplet $78i$ in a direction the same as that indicated by arrow F, so that the impact position of the satellite $78ai$ relative to the main droplet $78i$ will be on the side of the direction of travel.

As a result, a portion $82ai$ formed by the satellite $78ai$ discharged from the nozzle of the even-numbered nozzle row is formed so as to overlap and become included within a portion $80i$ formed by the main droplet $78i$ that has impacted the printing surface $76a$, as depicted in FIG. 4B. On the other hand, a portion $82ai$ formed by the satellite $78ai$ discharged from the nozzle of the odd-numbered nozzle row is formed outside the portion $80i$ formed by the main droplet $78i$ that has impacted the printing surface $76a$, as depicted in FIG. 4C.

Further, in a case where the printhead IJH travels in the direction indicated by arrow R in FIG. 4A, e.g., in the reverse direction, the portion $82ai$ formed by the satellite $78ai$ discharged from the nozzle of the even-numbered nozzle row is formed outside the portion $80i$, as shown in FIG. 4C. On the other hand, the portion $82ai$ formed by the satellite $78ai$ discharged from the nozzle of the oddnumbered nozzle row is formed so as to overlap and become included within a portion 80i formed by the main droplet 78i that has impacted the printing surface 76a, as depicted in FIG. 4B.

If the printhead prints a character or the like on a printing surface by being moved in the forward and reverse directions, the character is formed mostly by the main droplets 78i, and the satellites 78ai are mostly covered by the main droplets. However, the portion 82ai formed as shown in FIG. 4C at the edge portion of a printed character by a satellite not covered by the portion 80i formed by the main droplet will have an influence upon print quality. This portion appears as edge roughness at several parts of the printed character.

FIGS. 5A and 5B illustrate examples of edge roughness when characters are printed, in which FIG. 5A represents roughness due to printing in the forward direction and FIG. 5B roughness due to printing in the reverse direction. Such edge roughness of a character is noticeable visually and detracts from print quality.

SUMMARY OF THE INVENTION

Accordingly, an object of the present invention is to provide an ink-jet printing apparatus and method through which print quality can be improved by reducing edge roughness.

According to the present invention, the foregoing object is attained by providing an ink-jet printing apparatus in which a carriage mounting an ink-jet printhead having a plurality of print elements arrayed in at least two rows for performing printing by discharging ink from the print elements is scanned back and forth over a print medium in a direction cross (preferably, substantially orthogonal) to the direction in which the print elements are arrayed to thereby print on the print medium, the apparatus comprising: print data generating means for generating print data, which is in conformity with the structure of the printhead, from entered information; thinning means for thinning, from the print data generated, and in dependence upon the scanning direction of the carriage, print data printed by print elements of at least one of the two rows thereof; and driving means for driving the printhead in accordance with the print data that has been thinned by the thinning means.

Preferably, the thinning means alternately thins 50% or 100% of print data printed by the print elements of one row.

In a case where the entered information includes a character, edge detection means is provided for detecting print data representing an edge portion of the character, and the thinning means thins the print data representing the edge portion from the print data printed by the one row of print elements.

Further, according to the present invention, the foregoing object is attained by providing an ink-jet printing method in which a carriage mounting an ink-jet printhead having a plurality of print elements arrayed in at least two rows for performing printing by discharging ink from the print elements is scanned back and forth over a print medium in a direction cross (preferably, substantially orthogonal) to the direction in which the print elements are arrayed to thereby print on the print medium, the method comprising: a print data generating step of generating print data, which is in conformity with the structure of the printhead, from entered information; a thinning step of thinning, from the print data generated, and in dependence upon the scanning direction of the carriage, print data printed by print elements of at least one of the two rows thereof; and a driving step of driving the printhead in accordance with the print data that has been thinned at the thinning step.

Thus, in an ink-jet printing apparatus in which a carriage mounting an ink-jet printhead having a plurality of print elements arrayed in at least two rows for performing printing by discharging ink the print elements is scanned back and forth above a print medium in a direction cross to the direction in which the print elements are arrayed to thereby print on the print medium, print data conforming to the structure of the printhead is generated from entered information, print data printed by print elements of at least one of the two rows is thinned from the print data in conformity with the scanning direction of the carriage, and printing is performed by driving the printhead in accordance with the thinned print data.

Thus, the arrangement is such that if a satellite droplet associated with a main droplet of discharged ink is released at a certain angle, a noise component referred to as "edge roughness" is produced at an edge portion as the result of a satellite droplet impacting externally of a pixel area of the main droplet when either of the rows of print elements is driven in conformity with the scanning direction of the carriage. However, the print data that gives rise to this noise component is thinned so that the edge portion of the printed image can be sharpened.

Accordingly, a high-quality image having a sharp edge is obtained. This has the effect of improving print quality because edge portions are noticeable especially when printing a character. Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is an external view illustrating the structure of a printhead according to a first embodiment of an ink-jet printing apparatus according to the present invention;

FIG. 11 is a block diagram illustrating the arrangement of a control circuit of the ink-jet printing apparatus shown in FIG. 10.

DETAILED DESCRIPTION OF THE PREFERRED EMBODIMENTS

Preferred embodiments of the present invention will now be described in detail in accordance with the accompanying drawings.

[First Embodiment]
<Brief Description of Apparatus Main Unit>

Figure 10:
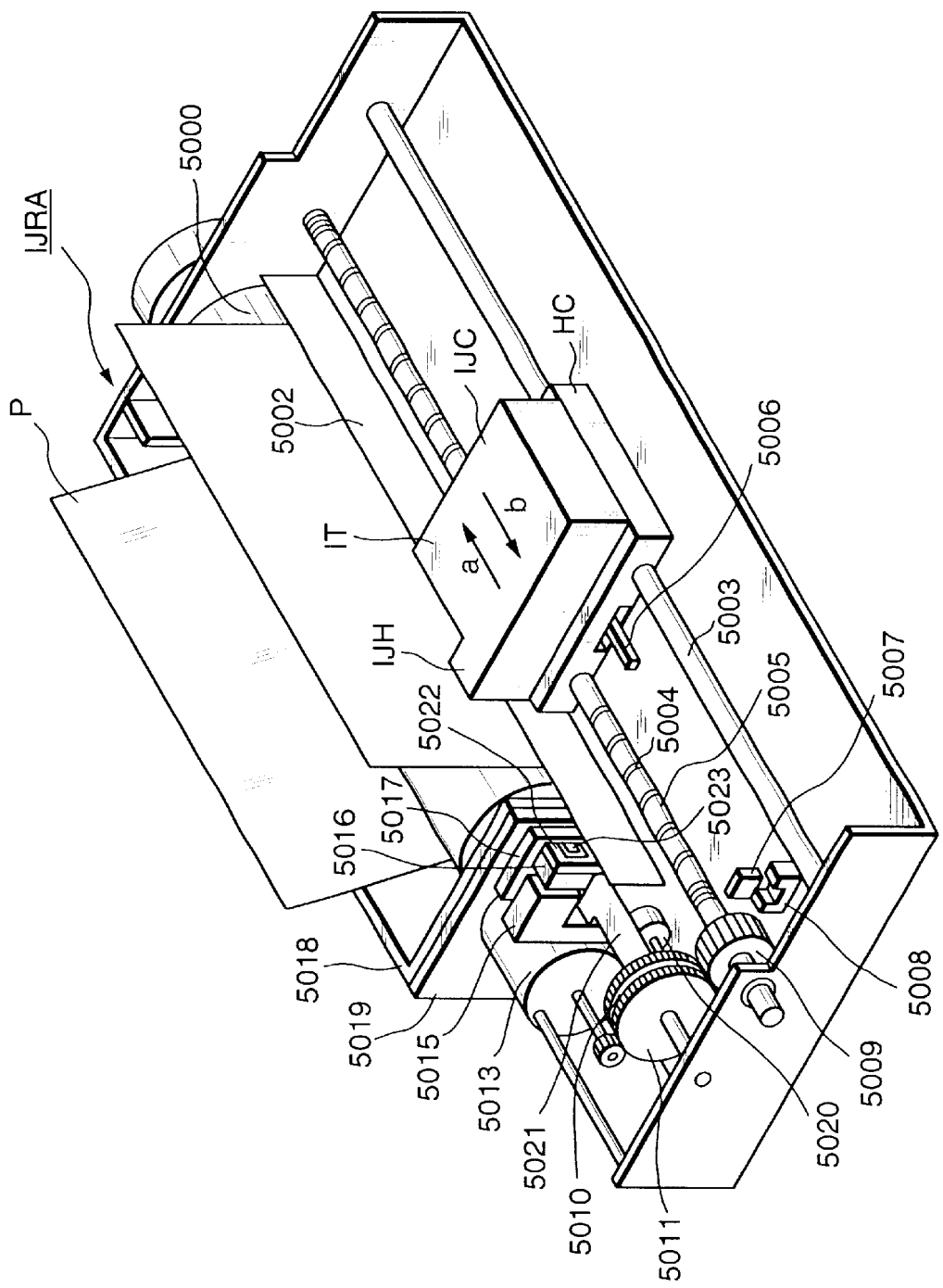
FIG. 10 is an external perspective view illustrating the structure of an ink-jet printing apparatus according to the present invention.

FIG. 10 is a perspective view showing an outer appearance of the construction of an ink-jet printer IJRA as a typical embodiment of the present invention. Referring to FIG. 10, a carriage HC engages with a spiral groove 5004 of a lead screw 5005, which rotates via driving force transmission gears 5009 to 5011 upon forward/reverse rotation of a driving motor 5013. The carriage HC has a pin (not shown), and is reciprocally scanned in the directions of arrows a and b while being supported by a guide rail 5003. An integrated ink cartridge IJC, incorporating a printhead IJH and an ink tank IT, is mounted on the carriage HC.

Reference numeral 5002 denotes a sheet pressing plate, which presses a paper sheet P against a platen 5000, ranging from one end to the other end of the scanning path of the carriage HC. Reference numerals 5007 and 5008 denote photocouplers which serve as a home position detector for recognizing the presence of a lever 5006 of the carriage in a corresponding region, and are used for switching, e.g., the rotating direction of the motor 5013.

Reference numeral 5016 denotes a member for supporting a cap member 5022, which caps the front surface of the printhead IJH; and 5015, a suction device for sucking ink residue inside the cap member. The suction device 5015 performs suction recovery of the printhead through an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

<Brief Description of Control Structure>

Next, description will be provided on the control circuit for executing print control of the above-described printing apparatus.

FIG. 11 is a block diagram showing an arrangement of a control circuit of the ink-jet printer IJRA. Referring to FIG. 2 showing the control circuit, reference numeral 1700 denotes an interface for inputting a print signal; 1701, an MPU; 1702, ROM for storing a control program executed by the MPU 1701; and 1703, DRAM for storing various data (aforementioned print signals, or print data supplied to the printhead IJH, and the like). Reference numeral 1704 denotes a gate array (G.A.) for controlling the supply of print data to the printhead IJH. The gate array 1704 also performs data transfer control among the interface 1700, the MPU 1701, and the DRAM 1703. Reference numeral 1710 denotes a carrier motor for conveying the printhead IJH; and 1709, a transfer motor for transferring a print medium. Reference numeral 1705 denotes a head driver for driving the printhead IJH; and 1706 and 1707, motor drivers for driving the transfer motor 1709 and the carrier motor 1710 respectively.

The operation of the aforementioned control structure is now described. When a print signal is inputted to the interface 1700, the print signal is converted to print data by the gate array 1704 and MPU 1701 intercommunicating with each other. As the motor drivers 1706 and 1707 are driven, the printhead IJH is driven in accordance with the print data transferred to the head driver 1705, thereby performing printing.

Though the control program executed by the MPU 1701 is stored in the ROM 1702, an arrangement can be adopted in which a writable storage medium such as an EEPROM is additionally provided so that the control program can be altered from a host computer connected to the ink-jet printer IJRA.

As mentioned above, the ink tank IT and the printhead IJH may be formed as an integrated body to construct the replaceable ink cartridge IJC. However, the ink tank IT and printhead IJH may be constructed so as to be separable from each other so that only the ink tank IT is replaced when the ink runs out.

<Printhead>

FIG. 1 is an external view, as seen from the discharge side, showing the structure of a first embodiment of a printhead according to the present invention. The printhead IJH is composed of three chips, and each chip has two rows of discharge ports (nozzles), one row of which has even-numbered nozzles and the other row of which has odd-numbered nozzles. Two of these printheads, which are separable at the portion indicated by the dashed line in FIG. 1, are mounted integrally on a carriage. Thus a total of six chips are used to perform printing with this printer.

The chips perform color printing by discharging K (black) ink, a colorant fixing liquid S, K (black) ink, C (cyan) ink, M (magenta) ink and Y (yellow) ink in the order mentioned starting from the left side. The S head discharges a liquid which insolubilizes a dye having a surface tension of 35 dyne/cm and a viscosity of 2.2 cps. The K ink has a surface tension of 44 dyne/cm and a viscosity of 2.0 cps.

The arrangement of the nozzles of the ink-jet printhead according to this embodiment is the same as that of the prior art described above. The arrangement is of the side-shooter type depicted in FIG. 9. The nozzle density is 600 dpi and the spacing between Seg 0 and Seg 1 is 4.23 $\mu$m. The ink flow path 5 communicating with the ink supply passage 105 common to the nozzles extends in the x direction, and a plurality of the nozzles 4 are arrayed in the y direction. A row of even-numbered nozzles Seg 0, Seg 2, . . . , Seg 254 is disposed on the left side of the ink supply passage 105, and a row of odd-numbered nozzles Seg 1, Seg 3, . . . , Seg 255 is disposed on the right side of the ink supply passage 105. The nozzles of the row of even-numbered nozzles and the nozzles of the row of odd-numbered nozzles are substantially symmetrical with respect to the ink supply passage 105.

Figure 2A:
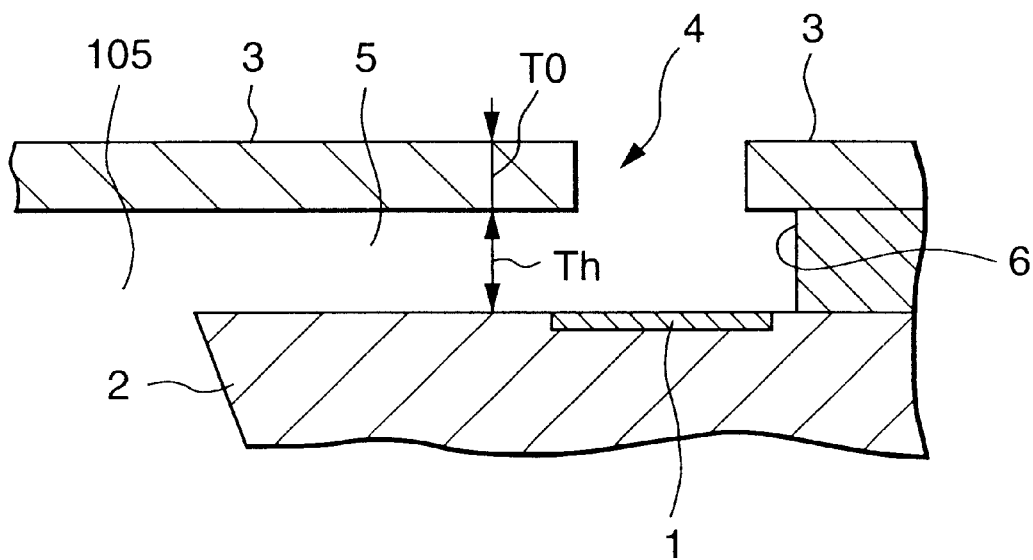
FIGS. 2A and 2B are enlarged views illustrating the structure of each nozzle in the printhead of FIG. 1.
Figure 2B:
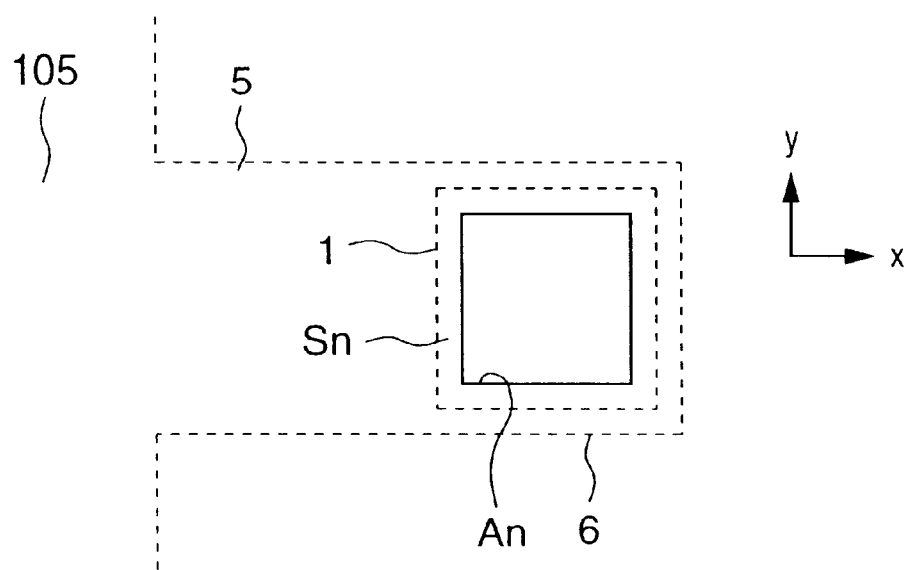
Figure 3A:
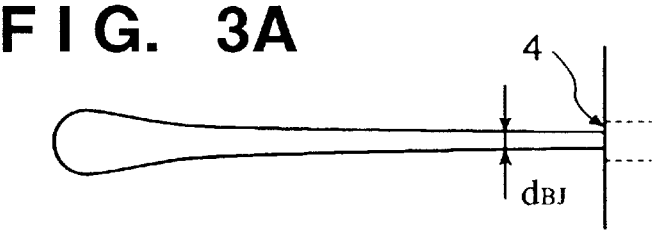
FIGS. 3A to 3D are diagrams illustrating the manner in which ink droplets are discharged in the bubble jet technique.
Figure 3B:
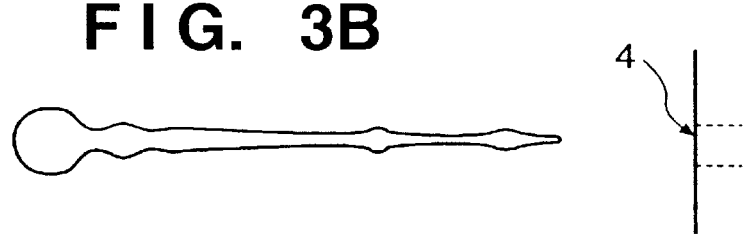
Figure 3C:
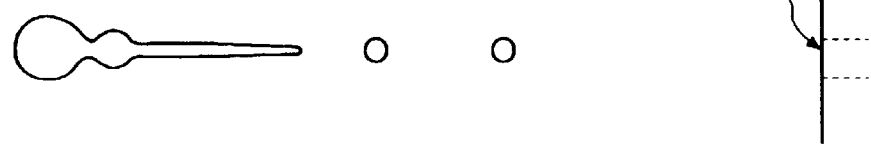
Figure 3D:
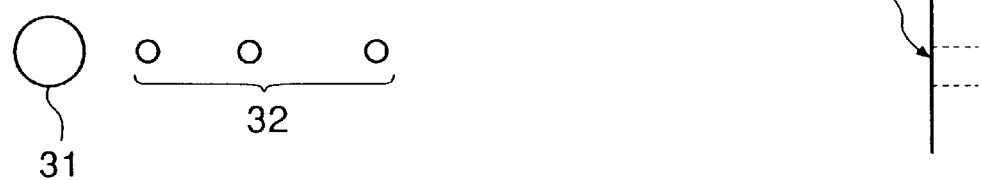
Figure 3E:
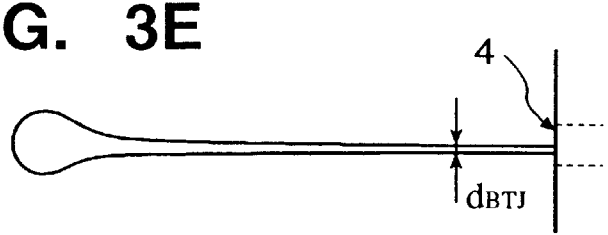
FIGS. 3E to 3H are diagrams illustrating the manner in which ink droplets are discharged in the bubble through jet technique.
Figure 3F:
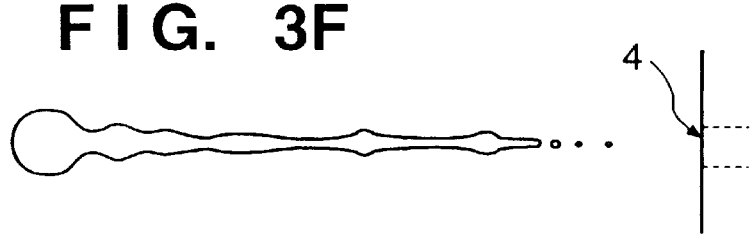
Figure 3G:
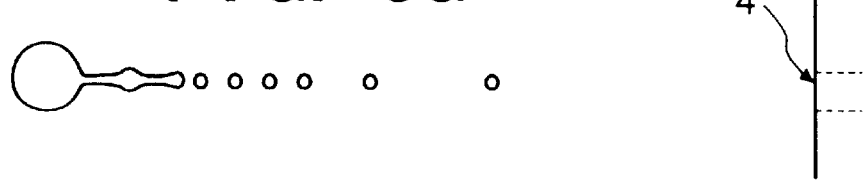
Figure 3H:
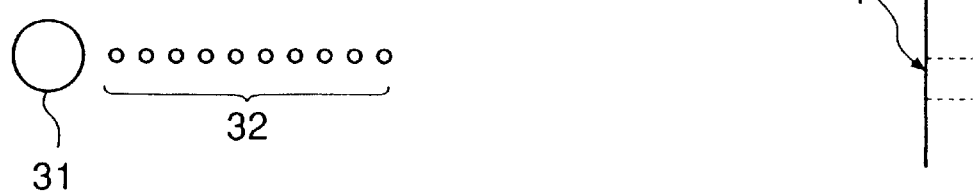
Figure 9:
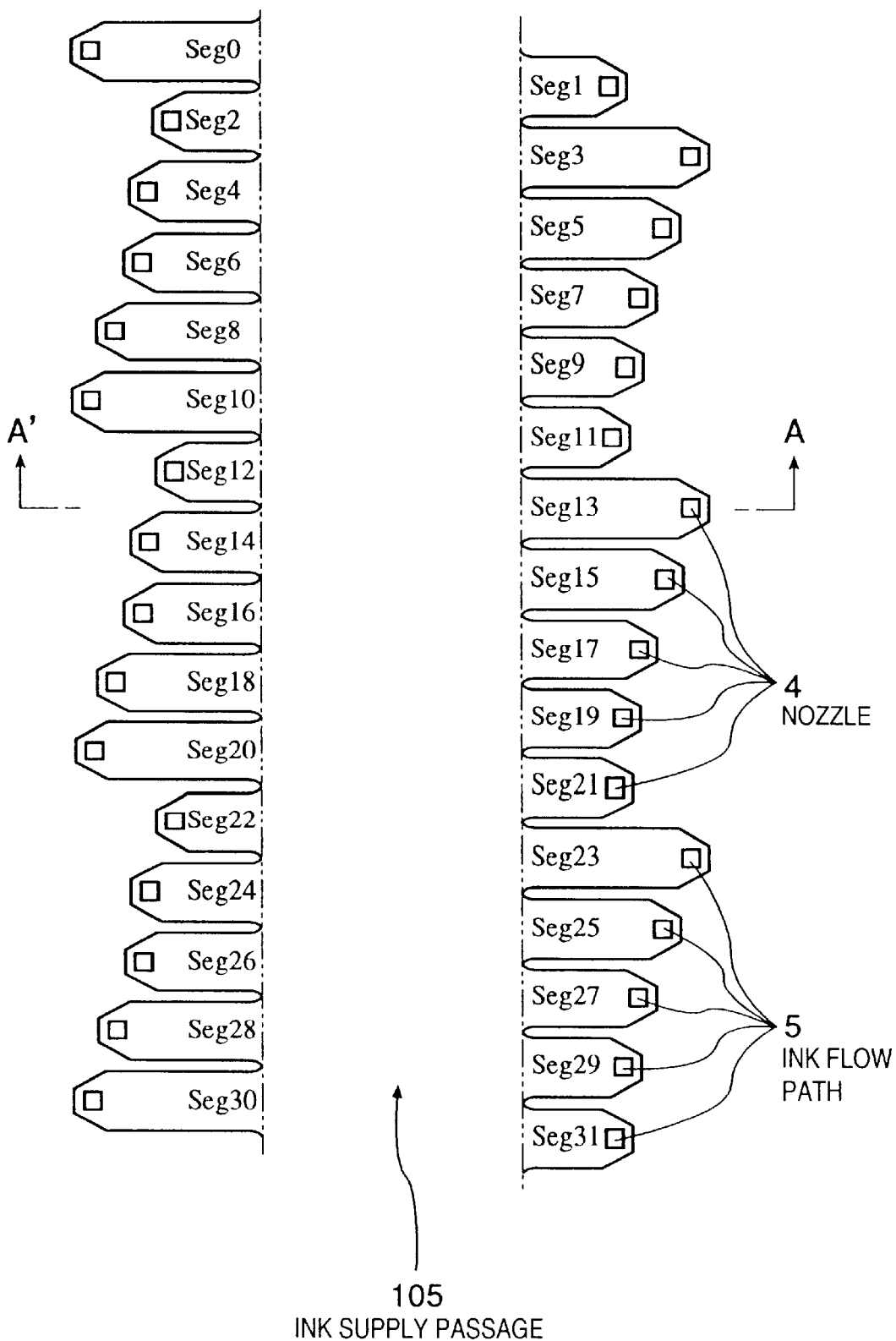
FIG. 9 is a diagram illustrating an example of the arrangement of nozzles of an ink-jet printhead.

FIGS. 2A and 2B are diagrams illustrating the structure of each nozzle, in which FIG. 2A is a sectional view taken along line A—A' of FIG. 9 and FIG. 2B is a top view of FIG. 2A. A rectangular heater 1 serving an electrothermal transducer is provided at a prescribed position on an element substrate 2. Disposed above the heater 1 is an orifice plate 3 having the nozzle 4 having a rectangular opening at a position corresponding to the heater 1. The ink flow path 5 communicating with the ink supply passage 105 is formed between the heater 1 and the orifice plate 3 by a flow path wall 6.

In this embodiment, height Th of the ink flow path 5 is 16 $\mu$m, thickness To of the orifice plate 3 is 10 $\mu$m, the heater 1 is a square of size 36×36 $\mu$m, and the heater area Sn is 1296 $\mu m^2$. Discharge area An in FIG. 2B is 676 $\mu m^2$. When a driving pulse having a voltage of 12 V is applied to the heater 1, the heater 1 heats up the ink rapidly so that an air bubble produced by vaporization of the ink is discharged into the outside air (bubble through jet discharge) together with an ink droplet. The volume of the droplet discharged from the head at this time is 18.5 pl.

<Driving Method>

In this embodiment, the printhead is scanned in forward and reverse directions and the print medium is transported each time the printhead is scanned in the forward and reverse directions so that printing is performed in each scanned area. The method of driving the printhead will now be described.

Figure 6A:
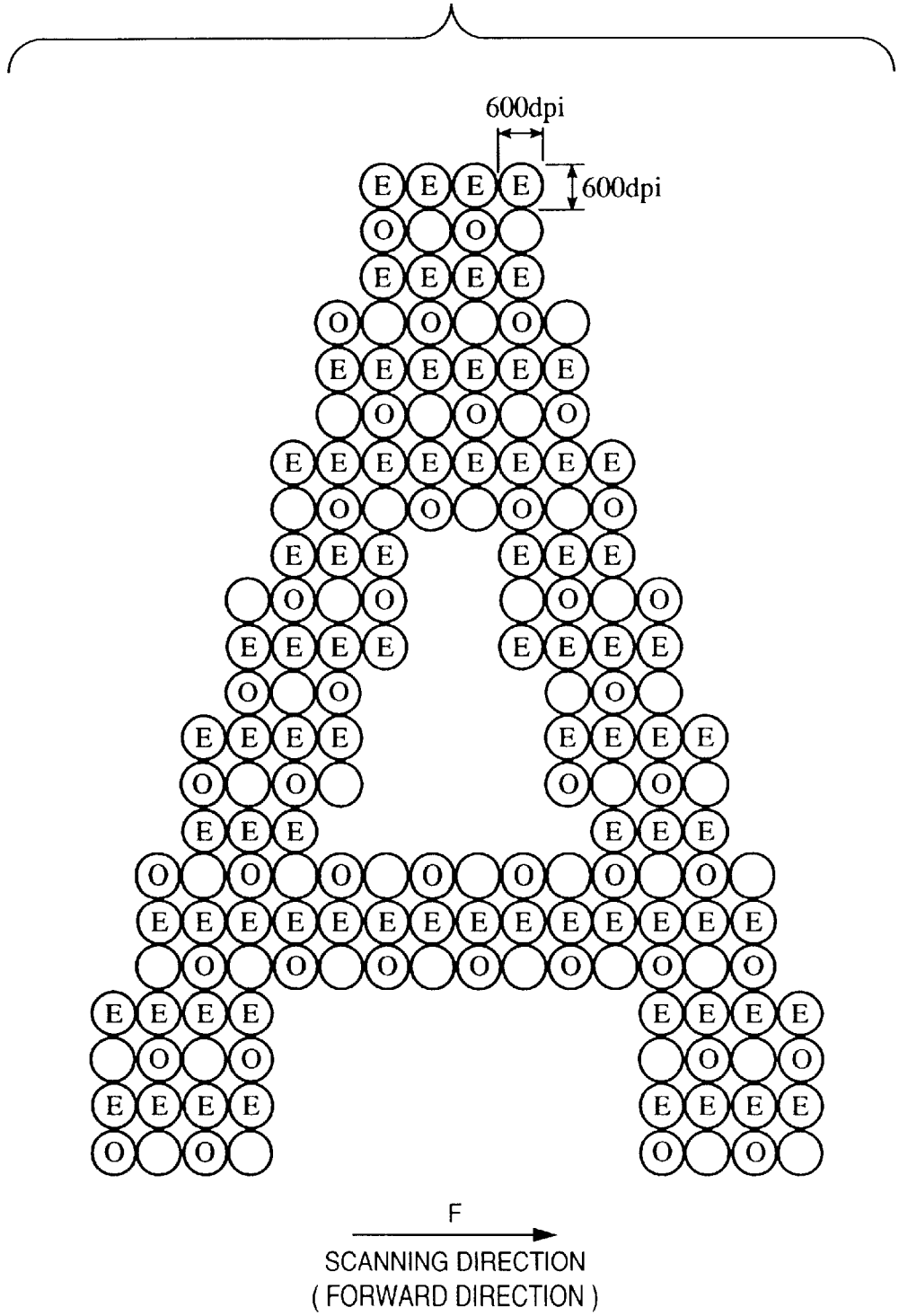
FIG. 6A is a diagram illustrating a character A that has been printed in the forward direction according to the first embodiment.
Figure 6B:
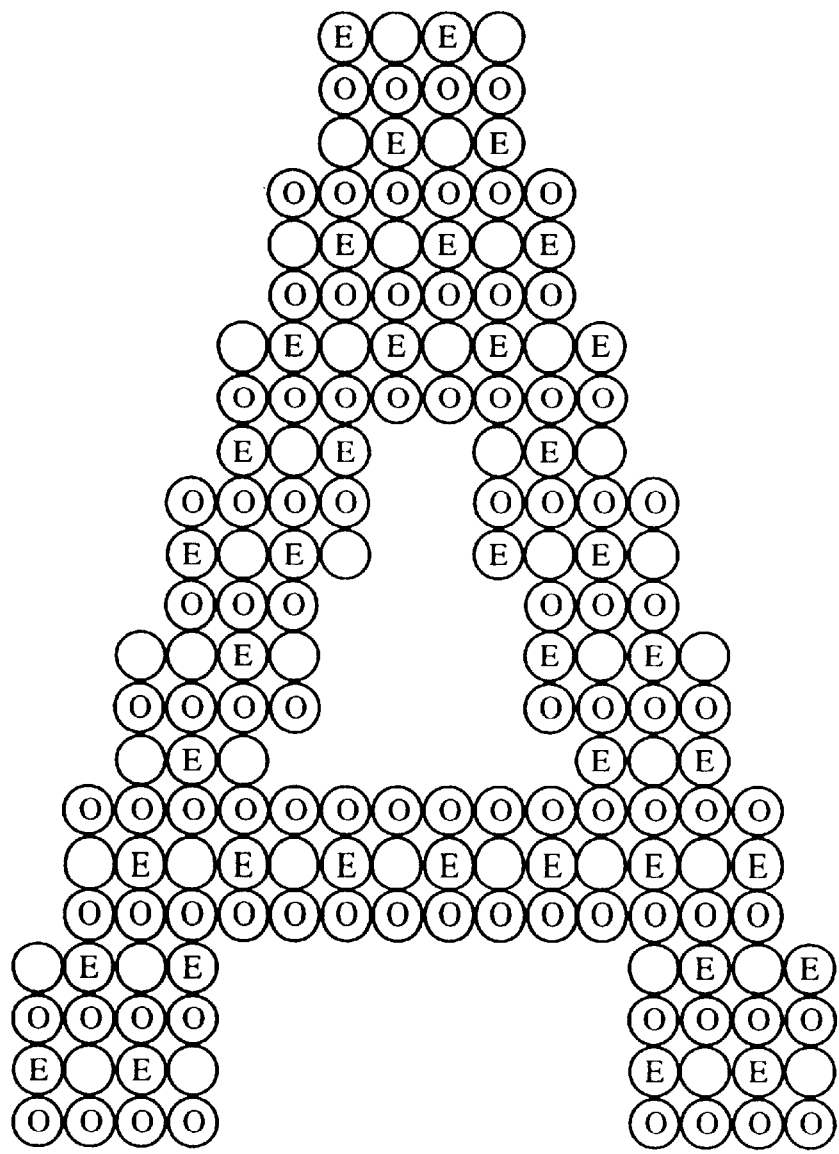
FIG. 6B is a diagram illustrating the character A that has been printed in the reverse direction according to the first embodiment.

FIGS. 6A and 6B are diagrams illustrating the manner in which the character "A" is printed by the scans in the forward and reverse directions, respectively. In FIGS. 6A, 6B, each circle mark indicates a pixel printed by a single ink droplet. Printing density is 600 dpi. The character "E" in a circle indicates that the corresponding pixel was printed by a nozzle in the row of even-numbered nozzles, and the character "O" in a circle indicates that the corresponding pixel was printed by a nozzle in the row of odd-numbered nozzles.

In this embodiment, drive is performed while thinning (or decimating) nozzles in the row of odd-numbered nozzles when printing is carried out by the scan in the forward direction. More specifically, as shown in FIG. 6A, drive is performed while thinning by 50% the print data regarding the row of odd-numbered nozzles in such a manner that every other nozzle in the row of odd-numbered nozzles prints in each of the horizontal and vertical directions. On the other hand, when printing is carried out by the scan in the reverse direction, as shown in FIG. 6B, drive is performed while thinning by 50% the print data regarding the row of even-numbered nozzles in such a manner that every other nozzle in the row of even-numbered nozzles prints in each of the horizontal and vertical directions. The circle marks in FIGS. 6A, 6B devoid of the "O" or "E" character indicate print data eliminated by thinning.

Figure 4A:
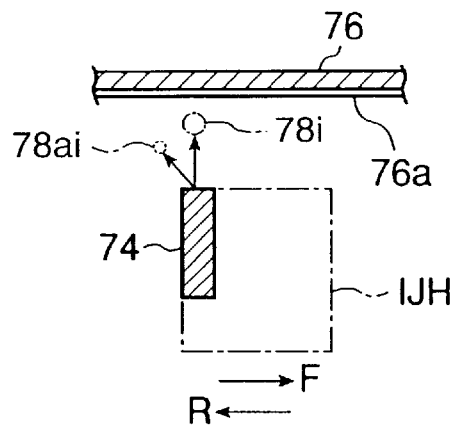
FIGS. 4A to 4C are diagrams useful in describing portions formed by discharged ink droplets.
Figure 4B:
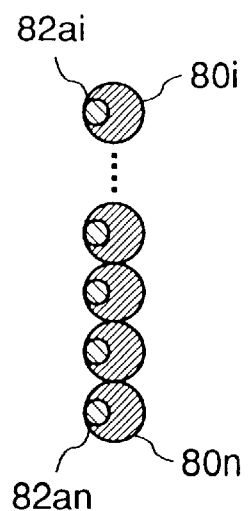
Figure 4C:
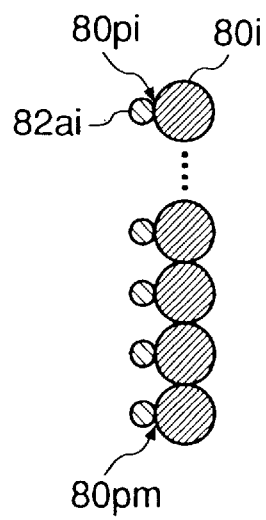
Figure 5A:
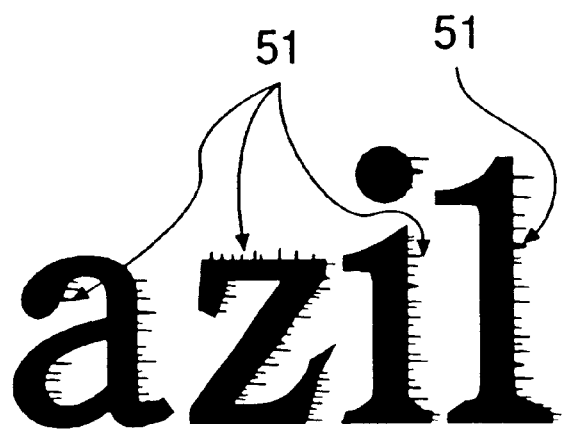
FIGS. 5A and 5B are diagrams illustrating edge roughness of printed characters.

This thinning is for the purpose of suppressing the occurrence of the phenomenon described earlier in connection with FIGS. 5A and 5B. Specifically, when printing is performed by the scan in the forward direction, as shown in FIG. 4B, a portion printed by a nozzle on the side of the row of even-numbered nozzles is formed in such a manner that the portion 82ai formed by the satellite 78ai overlaps and is included within the portion 80i formed as a pixel by the main droplet 78ai that impacted the recording surface 76a. As a consequence, the satellite does not appear as edge roughness of the character. However, as shown in FIG. 4C, a portion printed by a nozzle on the side of the row of odd-numbered nozzles is formed in such a manner that the portion 82ai formed by the satellite 78ai is formed outside the portion 80i formed as the pixel by the main droplet 78i that impacted the recording surface 76a. This gives rise to the aforesaid phenomenon in which the satellite droplet appears as the edge roughness depicted in FIG. 5A.

According to this embodiment, the print data printed by the nozzles in the row of odd-numbered nozzles is thinned by 50%, as shown in FIG. 6A, so as to reduce occurrence of the above-described edge roughness, thereby diminishing roughness at the edge portion of a character caused by satellite droplets. Furthermore, since the size of a satellite droplet is extremely small in comparison with a main droplet in the bubble through jet method of this embodiment, edge roughness that is almost imperceptible to the human eye is achieved when printing is performed in such a manner that satellite droplets will not overlap by executing print-data thinning that will not drive mutually adjacent oddnumbered nozzles.

Figure 5B:
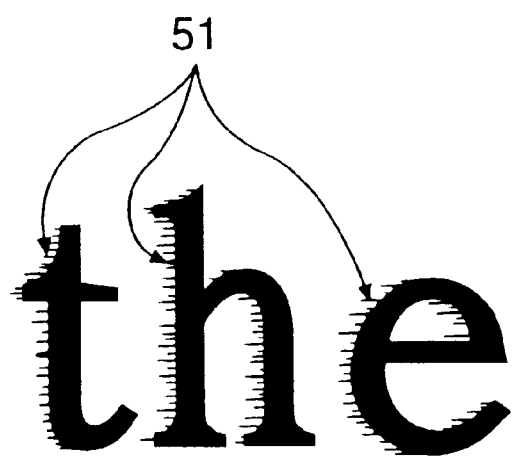

When printing is performed by the scan in the reverse direction, as shown in FIG. 4C, a portion printed by a nozzle on the side of the row of even-numbered nozzles is formed in such a manner that the portion 82ai formed by the satellite 78ai is formed outside the portion 80i formed as a pixel by the main droplet 78i that impacted the recording surface 76a and can be recognized as edge roughness of the kind shown in FIG. 5B. On the other hand, as shown in FIG. 4B, the portion printed by a nozzle on the side of the row of odd-numbered nozzles is formed in such a manner that the portion 82ai formed by the satellite 78ai is formed so as to overlap and become included within the portion 80i formed as a pixel by the main droplet 78i that has impacted the printing surface 76a. As a result, this portion does not appear as edge roughness.

By contrast, in accordance with this embodiment, print data used by the nozzles of the row of even-numbered nozzles is printed upon being thinned by 50%, as shown in FIG. 6B, when printing is performed by the scan in the reverse direction. As a result, edge roughness of a character caused by a satellite droplet is reduced in the same manner as when printing is performed in the forward direction.

With the printer control implementation shown in FIG. 11, such thinning of the print data is carried out by the gate array 1704 or MPU 1701 when the print data is generated or after the print data is generated.

Studies by the inventor reveal that a characteristic of the bubble through jet method according to this embodiment in comparison with the conventional bubble jet method is that the size of a discharged satellite droplet is much smaller than that of the main droplet, as illustrated in FIGS. 3A to 3H, and hence a difference in density between the densities in the forward and reverse directions does not occur in a character or the like formed by the main droplets that have impacted the printing surface.

After one pass of printing on plain paper in accordance with the printing method and print data of this embodiment, the printout was kept at ordinary temperature and ordinary humidity for 24 hours. The optical density (OD) of solidly shaded areas was measured by an RD 914 manufactured by Macbeth, Inc. The value obtained was 1.40 or higher. This means that the density of a character printed in accordance with this invention is sufficiently high.

Thus, in accordance with this embodiment as described above, it is possible to obtain an image of a high-density black character having a sharp edge.

[Second Embodiment]

A second embodiment of the present invention will now be described. The structure of this embodiment is similar to that of the first embodiment set forth above; only the method of driving the printhead differs. Only the features that distinguish this embodiment from the first embodiment will be described.

This embodiment performs printing at high speed by doubling the traveling speed of the carriage on which the printhead is mounted. This embodiment is suited to a draft printing mode that requires printing at high speed.

Figure 7A:
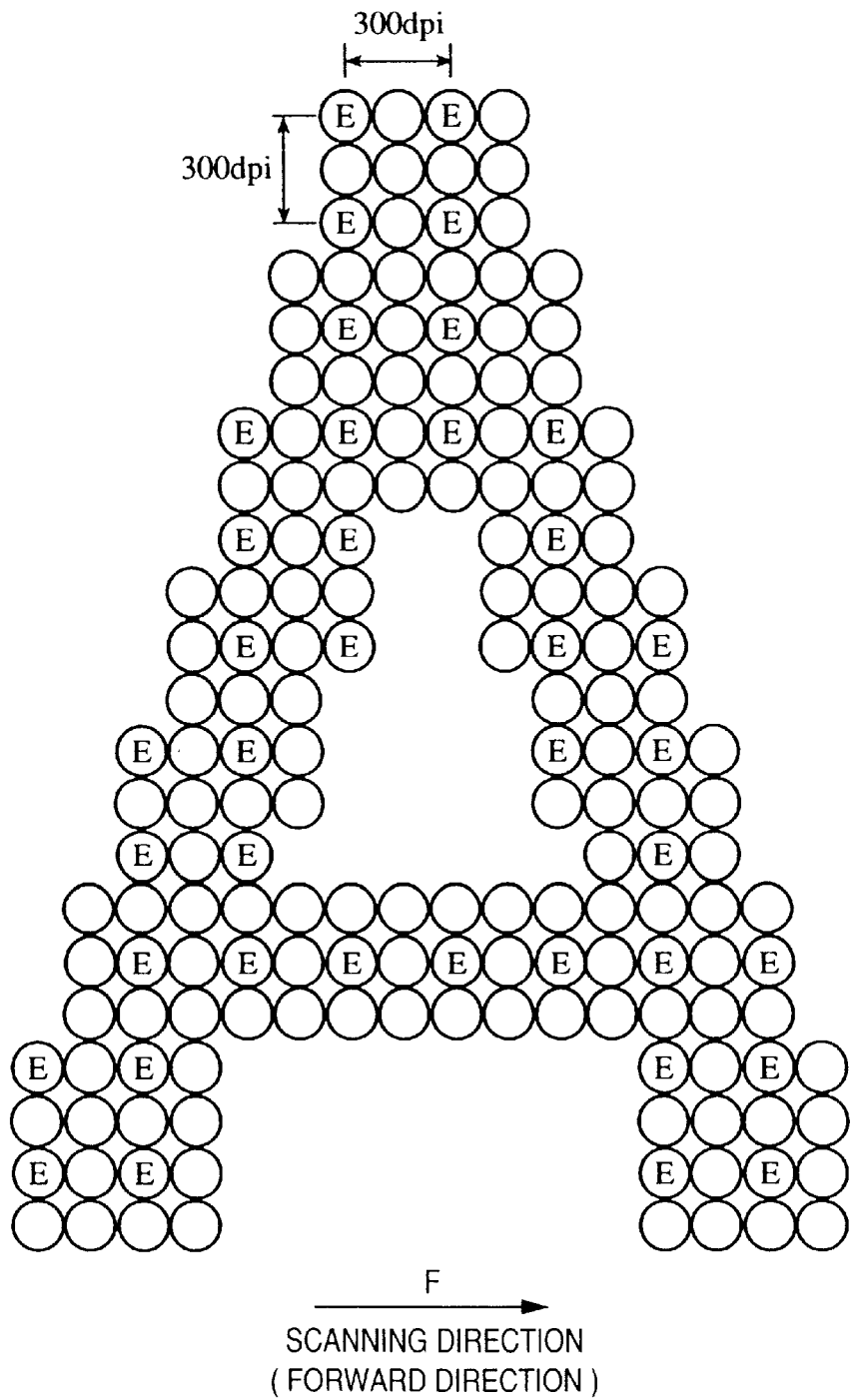
FIG. 7A is a diagram illustrating a character A that has been printed in the forward direction according to a second embodiment.
Figure 7B:
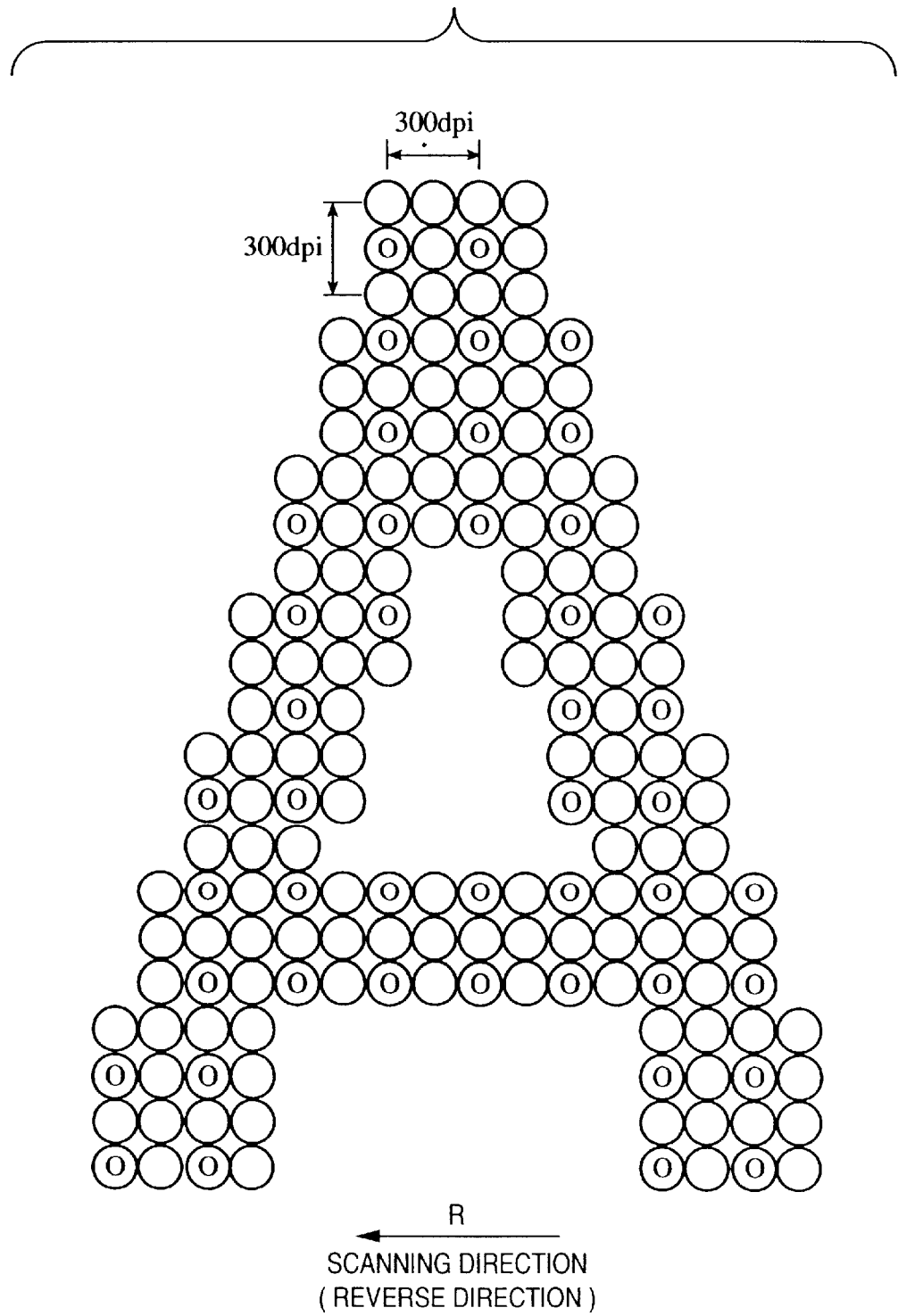
FIG. 7B is a diagram illustrating the character A that has been printed in the reverse direction according to the second embodiment.

FIGS. 7A and 7B are diagrams illustrating the manner in which the character "A" is printed by the scans in the forward and reverse directions, respectively.

According to this embodiment, printing is performed upon eliminating, by thinning, all of the print data relating to the row of odd-numbered nozzles, as shown in FIG. 7A, when printing is carried out by the scan in the forward direction, so as to reduce the occurrence of edge roughness. When printing is carried out by the scan in the reverse direction, printing is performed upon eliminating, by thinning, all of the print data relating to the row of even-numbered nozzles, as shown in FIG. 7B.

If this arrangement is adopted, then, regardless of the direction in which printing is performed, the portion 82ai formed by the satellite 78ai is formed so as to overlap and become included within a portion 80i formed as a pixel by the main droplet 78i that has impacted the printing surface 76a. As a result, character edge roughness due to satellite droplets does not occur.

With the printer control implementation shown in FIG. 11, such thinning of the print data is carried out by the gate array 1704 or MPU 1701 when the print data is generated or after the print data is generated.

In terms of printed character quality, an image having a sharp edge is obtained.

Thus, in accordance with this embodiment as described above, an image having a sharp edge is obtained even when printing is performed at high speed.

[Third Embodiment]

A third embodiment of the present invention will now be described. The structure of the third embodiment is similar to that of the first embodiment set forth above and only the features that distinguish this embodiment from the first embodiment will be described.

According to this embodiment, multiple-tone printing is performed using two types of ink, namely light and dark ink, for cyan and magenta, in which the chip arrangement of the printhead IJH shown in FIG. 1 is such that the inks are K (black), UC (light cyan), UM (light magenta), C (cyan), M (magenta) and Y (yellow) in the order mentioned starting from the left side.

The K ink used in this embodiment has a surface tension of 34 dyne/cm and a viscosity of 2.0 cps.

Figure 8A:
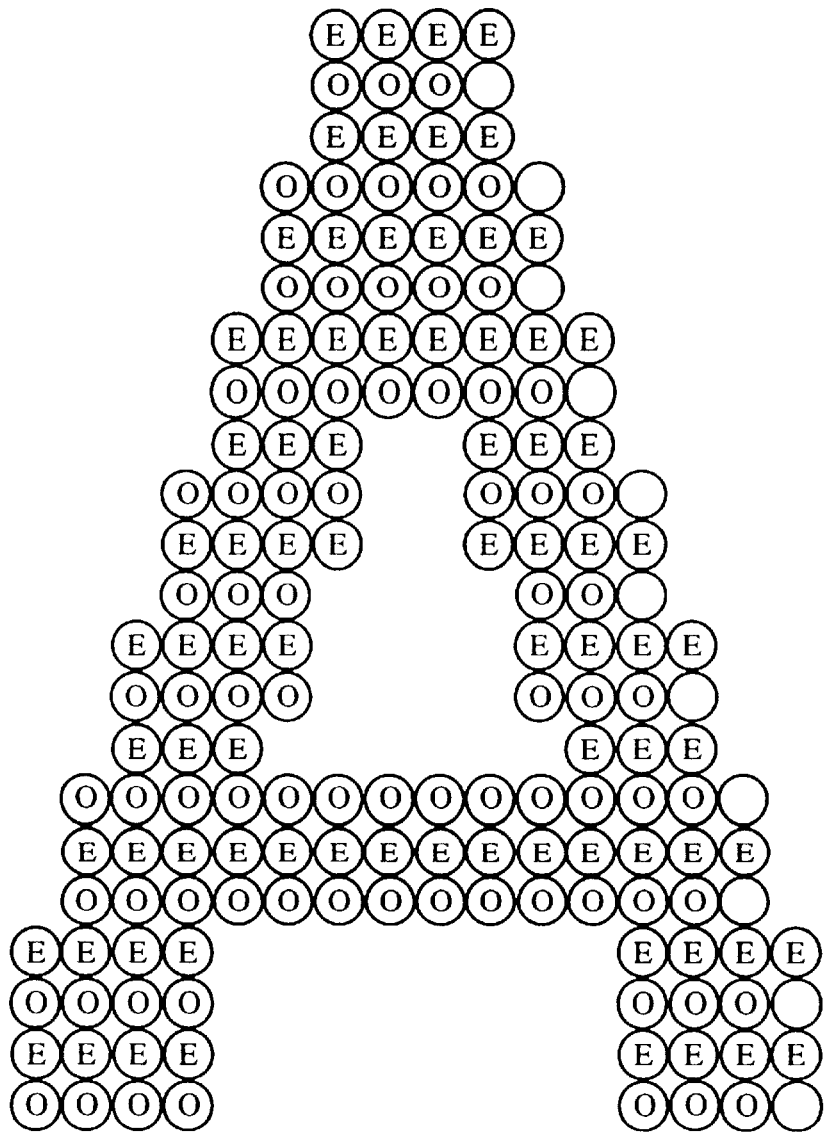
FIG. 8A is a diagram illustrating a character A that has been printed in the forward direction according to a third embodiment.
Figure 8B:
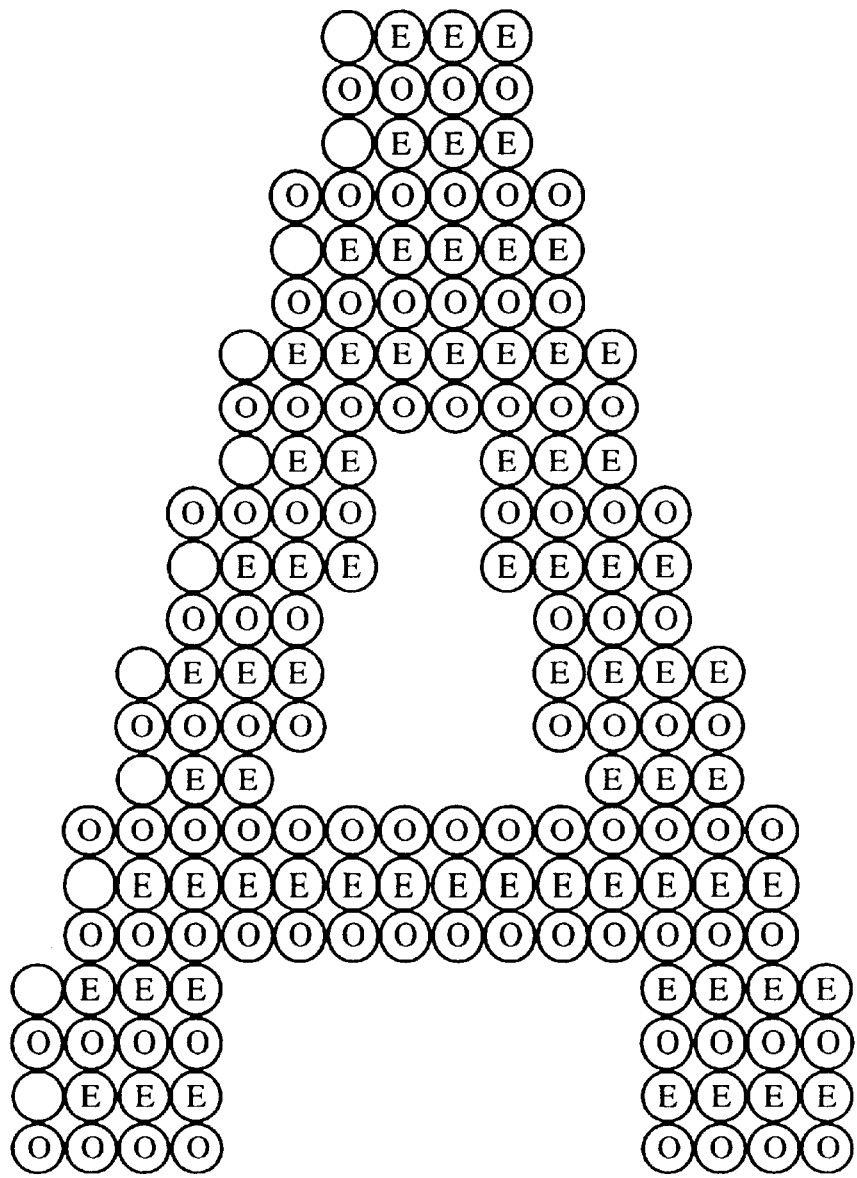
FIG. 8B is a diagram illustrating the character A that has been printed in the reverse direction according to the third embodiment.

FIGS. 8A and 8B are diagrams illustrating the manner in which the character "A" is printed by the scans in the forward and reverse directions, respectively.

According to this embodiment, printing is performed by thinning only the data of portions where edge roughness is easily recognizable. More specifically, when printing is performed by the scan in the forward direction, printing is carried out upon eliminating, by thinning, all odd-numbered data that is farthest downstream with respect to the direction of travel and, moreover, that forms an edge portion of the print data, as shown in FIG. 8A. When printing is performed by the scan in the reverse direction, on the other hand, printing is carried out upon eliminating, by thinning, all even-numbered data that is farthest downstream with respect to the direction of travel and, moreover, that forms an edge portion of the print data, as shown in FIG. 8B.

In order to achieve this, the gate array 1704 which produces the print data in the printer control implementation of FIG. 11 is provided with a print-data edge detector or edge filter.

In the case of this embodiment, the portion thinned is only the edge portion of print data farthest downstream with respect to the direction of printing. As a result, in terms of character quality, it is possible to obtain an image of a high-density black character having a sharp edge.

[Other Embodiments]

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet printing apparatus in which a carriage mounting an ink-jet printhead having a plurality of print elements arrayed in at least two rows for performing printing by discharging ink from the print elements is scanned back and forth over a print medium in a direction cross to the direction in which the print elements are arrayed to thereby print on the print medium, the apparatus comprising:

print data generating means for generating print data, which is in conformity with the structure of the printhead, from entered information;

thinning means for thinning the print data to be printed by the row of print elements in either one of at least two rows, the row of print elements being set as a subject for thinning based on the scanning direction of the carriage; and driving means for driving the printhead in accordance with the print data that has been thinned by said thinning means.

2. The apparatus according to claim 1, wherein said thinning means alternately thins, by 50%, the print data printed by the print elements of the one row of print elements.

3. The apparatus according to claim 1, wherein said thinning means thins all of the print data printed by the print elements of the one row of print elements.

4. The apparatus according to claim 1, further comprising edge detection means for detecting print data representing an edge portion of a character in a case where the entered information includes the character;

said thinning means thinning the print data representing the edge portion from the print data printed by the one row of print elements.

5. The apparatus according to claim 1, wherein said thinning means thins print data, which is printed by the print elements of a row of odd-numbered print elements, when printing is performed in a forward direction, and thins print data, which is printed by the print elements of a row of even-numbered print elements, when printing is performed in a reverse direction.

6. The apparatus according to claim 1, wherein said printhead discharges ink by utilizing thermal energy, said printhead having a thermal energy transducer, which is for generating thermal energy applied to the ink, provided for each print element.

7. The apparatus according to claim 1, wherein said printhead is so adapted as to discharge ink by passing bubbles, which have been produced in ink by thermal energy, through the atmosphere.

8. An ink-jet printing method in which a carriage mounting an ink-jet printhead having a plurality of print elements arrayed in at least two rows for performing printing by discharging ink from the print elements is scanned back and forth over a print medium in a direction cross to the direction in which the print elements are arrayed to thereby print on the print medium, said method comprising:

a print data generating step of generating print data, which is in conformity with the structure of the printhead, from entered information;

a thinning step of thinning the print data to be printed by the row of print elements in either one of the at least two rows, the row of print elements being set as a subject for thinning based on the scanning direction of the carriage; and a driving step of driving the printhead in accordance with the print data that has been thinned at said thinning step.

9. The method according to claim 8, wherein said thinning step alternately thins, by 50%, the print data printed by the print elements of the one row of print elements.

10. The method according to claim 8, wherein said thinning step thins all of the print data printed by the print elements of the one row of print elements.

11. The method according to claim 8, further comprising an edge detection step of detecting print data representing an edge portion of a character in a case where the entered information includes the character;

said thinning step thinning the print data representing the edge portion from the print data printed by the one row of print elements.

12. The method according to claim 8, wherein said thinning step thins print data, which is printed by the print elements of a row of odd-numbered print elements, when printing is performed in a forward direction, and thins print data, which is printed by the print elements of a row of even-numbered print elements, when printing is performed in a reverse direction.

* * * * *